(12) United States Patent
Renner

(10) Patent No.: US 7,350,431 B2
(45) Date of Patent: Apr. 1, 2008

(54) DEVICE FOR REDUCING MOVEMENT OF THE MAIN SHAFT

(75) Inventor: Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 104 days.

(21) Appl. No.: 11/284,473

(22) Filed: Nov. 22, 2005

(65) Prior Publication Data

US 2006/0117881 A1 Jun. 8, 2006

(30) Foreign Application Priority Data

Nov. 26, 2004 (DE) .................... 10 2004 057 124

(51) Int. Cl.
*F16H 3/08* (2006.01)

(52) U.S. Cl. .................... 74/325; 74/330; 74/331

(58) Field of Classification Search .................... 74/325, 74/339, 329, 330, 331; 384/619, 620
See application file for complete search history.

(56) References Cited

U.S. PATENT DOCUMENTS

| | | | | |
|---|---|---|---|---|
| 3,454,111 | A | * | 7/1969 | Niess .................... 173/176 |
| 3,934,956 | A | * | 1/1976 | Pitner .................... 384/455 |
| 4,589,816 | A | * | 5/1986 | Eberle et al. .................... 414/680 |
| 5,020,385 | A | | 6/1991 | Bader |
| 5,921,137 | A | | 7/1999 | Buri et al. |
| 6,044,721 | A | | 4/2000 | Genise |
| 6,250,172 | B1 | | 6/2001 | Pigozzi et al. |
| 6,463,822 | B1 | * | 10/2002 | Bader et al. .................... 74/333 |
| 6,463,823 | B2 | | 10/2002 | Walker |
| 6,626,796 | B2 | | 9/2003 | Schwab et al. |
| 2002/0031289 | A1 | * | 3/2002 | Kenney .................... 384/620 |
| 2004/0261556 | A1 | | 12/2004 | Döbele |

FOREIGN PATENT DOCUMENTS

| | | |
|---|---|---|
| DE | 40 06 653 A1 | 9/1990 |
| DE | 19604824 A1 * | 8/1997 |
| DE | 196 33 279 A1 | 2/1998 |
| DE | 199 26 697 A1 | 12/2000 |
| DE | 100 16 582 A1 | 10/2001 |
| DE | 101 05 749 A1 | 8/2002 |
| DE | 101 52 857 | 5/2003 |
| EP | 0 541 023 A1 | 5/1993 |
| EP | 0 985 860 A1 | 8/1999 |
| EP | 1 035 357 A1 | 9/2000 |
| EP | 1 092 894 A2 | 4/2001 |
| WO | WO 0029240 A1 * | 5/2000 |
| WO | WO-02/092378 A1 | 11/2002 |

* cited by examiner

*Primary Examiner*—Sherry Estremsky
(74) *Attorney, Agent, or Firm*—Davis Bujold & Daniels, P.L.L.C.

(57) ABSTRACT

A design for a device for the reduction of movement of the main shaft (6) in the disengaged position in a transmission with at least two countershafts in which there is an axial transfer of forces between the drive shaft (7) and the main shaft (6) which is coaxially arranged through a connection of the main shaft (6) with a part of the axial bearing (13) on the drive shaft (7). There is a device (2) which is used to load the main shaft (6) against the drive shaft (7) through a loading of the part of the axial bearing (13) connected to the main shaft (6) against other parts or against the axial bearing (4) on the drive shaft (7).

7 Claims, 1 Drawing Sheet

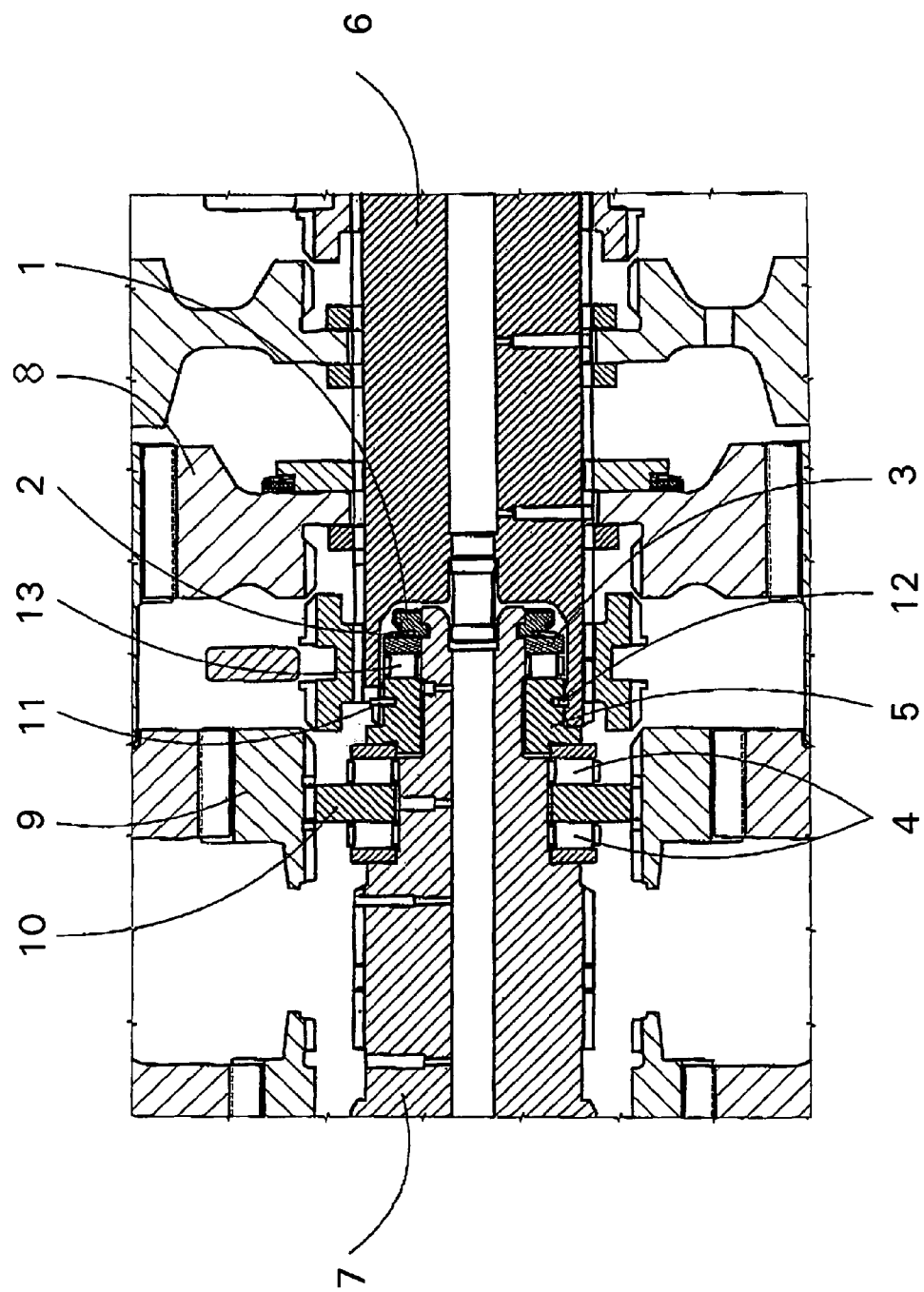

DEVICE FOR REDUCING MOVEMENT OF THE MAIN SHAFT

This application claims priority from German Application Serial No. 10 2004 057 124.4 filed Nov. 26, 2004.

FIELD OF THE INVENTION

The invention refers to a device used for the reduction of movement of the main shaft in the disengaged position in a transmission with at least two countershafts.

BACKGROUND OF THE INVENTION

In the case of transmissions with two counter shafts, the drive shaft is fixed axially and radially; the main shaft arranged coaxially with the drive shaft must be able to move freely in the radial direction for achieving load balancing, whereby while engaged, the main shaft would be centered on the position of the transmitting gear with the help of a sleeve.

Typically the drive shaft in such types of transmissions is found to be partly above the axial length and with a part of its axial bearing within the main shaft. Thereby the main shaft is connected to a part of the axial bearing on the drive shaft through a corresponding part such as a retaining ring. This is done in such a way that the transmission of axial forces from the main shaft to the drive shaft and vice versa is possible.

In the disengaged position or during shifting from one gear to gear, or when there is no sleeve, the main shaft is not centered and thus deviates until it lies on the drive shaft for example. This can result in unnecessary knocking of the shafts under the influence of centrifugal forces and as a result of imbalance or friction which would result in the wobbling of the gears and that would produce an unpleasant rattling noise.

In addition, the main shaft is moved to the center of the gear during the engagement of the gear through a clutch and thereby centered which could result unfortunately in wearing out of the clutch.

The below mentioned invention thus has the objective of developing a device to reduce the movement of the main shaft in the disengaged condition in a transmission with at least two counter shafts as a result of which the disadvantages of the current technology can be countered. In addition the device should be manufacturable and assembled in a cost effective manner.

Accordingly it is suggested that the main shaft is loaded compared to the drive shaft so that the main shaft is centered even in the disengaged position.

SUMMARY OF THE INVENTION

A device for the reduction of the movement of the main shaft in the disengaged position in the case of a transmission with at least two counter shafts is suggested in which there is an axial transfer of forces between the drive shaft and coaxially located main shaft through a connection of the main shaft with a part of the axial bearing on the drive shaft. This device is built such that there is a loading of the main shaft compared to the drive shaft through a loading of the part of the axial bearing connected to the main shaft against other parts or the axial bearing.

With respect to the preferred design of the mentioned invention, it is suggested that the loading is achieved with the help of a spring element which loads the part of the axial bearing joined to the main shaft against the other parts or the axial bearing. It is preferable to have a disc spring as the spring element.

Since the axial bearing rollers always have a circular movement and can deviate only after overcoming the static friction between the bearing and the track, the main shaft can be centered only by a sufficiently large spring force. In this case the spring force or the loading at the main shaft against the drive shaft should just be large enough that the centrifugal forces of the main shaft are contained. As a result of this there would be no disadvantages during the transmission of forces.

BRIEF DESCRIPTION OF THE DRAWING

The invention will now be described, by way of example, with reference to the accompanying drawing in which:

The sole FIGURE which shows a schematic of the relevant sectional view of the invention in a transmission with two countershafts.

DETAILED DESCRIPTION OF THE INVENTION

In the given FIGURE, a drive shaft of the transmission is denoted by 7 and a main shaft is denoted by 6. Further, a wheel arranged on the main shaft 6 is denoted with 8 and a constant arranged on the drive shaft 7 is denoted by 9. They are designed as bevel toothed gears. There is a second constant 9 on the drive shaft 7 radially placed on a disc 10. The disc 10 is attached to two axial bearings 4 which are built as rolling bearings such that the disc 10 can rotate freely with the second constant 9.

For the purpose of axial support of the disc 10 in the direction of the main shaft 6, there is a bearing ring 5 which has a gap 11 in which there is a safety ring 12. Further, the ring 5 is held on the side opposite the bearing 4 with the help of another axial bearing 13 built in the form of a roller bearing and a bearing disc 3. The bearing disc 3 is fixed with the help of a safety ring 1 and the ring 1 is built as a divided ring.

The roller bearing 5 lies over a part of its axial length within the main shaft 6 whereby the safety ring 12 is over a part of its radial length within a gap of the main shaft 6 so that an axial transfer of forces is achieved between the shafts 6 and 7.

As per the invention, the innovative device for the reduction of movement of the main shaft 6 in the disengaged position comprises a device 2 for loading of the main shaft 6 against the drive shaft 7. This loading is achieved through a part of the axial bearing 13 joined to the main bearing 6 against other parts or the axial bearing 4 on the drive shaft 7.

The device 2 for loading the main shaft 6 against the drive shaft 7 is designed as a disc spring 2 which is placed between the divided ring 1 and the bearing disc 3 as shown in the example FIGURE. As a result of this, the axial bearing 13 and the bearing ring 5 connected to the main shaft 6 (with the help of a safety ring 12) are pressed against the axial bearing 4 on the main shaft 7.

As explained earlier, since the axial roller bearing is placed to describe a circular motion and this can deviate only upon overcoming the static friction between the roller bearing and the track, the main shaft can be centered with the help of a large enough spring force. Hereby the spring force is just large enough to hold the centrifugal forces of the main shaft.

As a result of the innovative concept, a cost effective and easily achievable solution is envisaged which can avoid the reduction of the movement of the main shaft in the disengaged position in a transmission with at least two counter shafts. The innovative solution could be used in other similar systems also.

Understandably every constructive design, especially every spatial arrangement of spring elements as far as it may be technically meaningful, comes under the protection of the above mentioned requirement, without influencing the function of the device (as specified in the requirements) even when the design is not shown explicitly in the FIGURE or explained as above.

REFERENCE NUMERALS 1 divided ring, safety ring
2 disc spring
3 bearing disc
4 axial bearing
5 bearing ring
6 main shaft
7 drive shaft
8 wheel
9 second constant
10 disc
11 gap
12 safety ring
13 axial bearing

The invention claimed is:

1. A device for reduction of movement of a main shaft (6) of a transmission having at least two counter shafts, a drive shaft (7) and a main shaft (6), the device comprising:
in a region of the drive shaft (7) coaxially extending within the main shaft (6),
a bearing ring (5) coaxially located on the drive shaft (7),
a first ring (12) axially and fixedly engaged between the bearing ring (5) and the main shaft (6),
a second ring (1) axially fixed to an end of the drive shaft (7), and
a spring element (2) located between the first (12) and the second (1) rings and exerting
a first axial force on the drive shaft (7) through the second ring (1) to resiliently bias the drive shaft (7) toward the main shaft (6), and
a second axial force on the main shaft (6) through the bearing ring (5) and the first ring (12) to resiliently bias the main shaft (6) toward the drive shaft (7).

2. The device for reduction of movement of the main shaft (6) according to claim 1, wherein the spring element (2) is a disc spring (2).

3. The device for reduction of movement of the main shaft (6) according to claim 1, wherein one of a loading of the main shaft and the first and the second axial forces exerted by the spring element is sufficient to restrain centrifugal forces of the main shaft (6).

4. A device reducing movement, in a countershaft transmission, between a main shaft (7) and a coaxial drive shaft (6), the device comprising:
in an end region of the drive shaft (7) extending coaxially within a hollow region of the main shaft (6),
a bearing ring (5) having a region extending along the end region of the drive shaft (7) within the hollow region of the main shaft (6),
a divided ring (1) axially fixed to the end region of the drive shaft (7),
a disk spring (2) located between the bearing ring (5) and the divided ring (1), and
a safety ring (12) axially engaged between the bearing ring (5) and the main shaft (6) in the hollow region of the main shaft (6), whereby
the disk spring (2) exerts a first axial force on the drive shaft (7), through the divided ring (1), to resiliently bias the drive shaft (7) toward the main shaft (6), and
the disk spring (2) exerts a second axial force on the main shaft (6), through the bearing ring (5) and the safety ring (12), to resiliently bias the main shaft (6) toward the drive shaft (7).

5. The device reducing movement according to claim 4, further comprising an axial bearing (13) located between and bearing against the disk spring (1) and the bearing ring (5).

6. The device reducing movement according to claim 4, wherein the bearing ring (5) further includes a drive shaft axial face, on a second region, extending away from an end region of the drive shaft (7) and bearing against a corresponding axial face of the drive shaft (7).

7. A device for reducing movement, in a countershaft transmission, between a main shaft (7) and a coaxial drive shaft (6), the device comprising:
a bearing ring (5) coaxial with the drive shaft (7) and the main shaft (6),
a first retainer element (12) axially engaged between the bearing ring (5) and the main shaft (6),
a second retainer element (1) axially fixed to the end region of the drive shaft (7), and
a spring element (2) located between the bearing ring (5) and the second retainer (1) so that the spring element (2) exerts:
a first axial force on the drive shaft (7), through the second retainer (1), to resiliently bias the drive shaft (7) toward the main shaft (6), and
a second axial force on the main shaft (6), through the bearing ring (5) and the first retainer element (12), to resiliently bias the main shaft (6) toward the drive shaft (7).

* * * * *